(No Model.)
S. J. WEAVER.
HEATING FEED WATER.
No. 304,679. Patented Sept. 2, 1884.
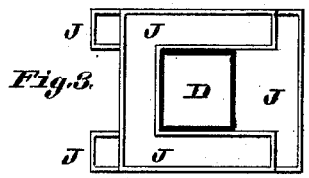
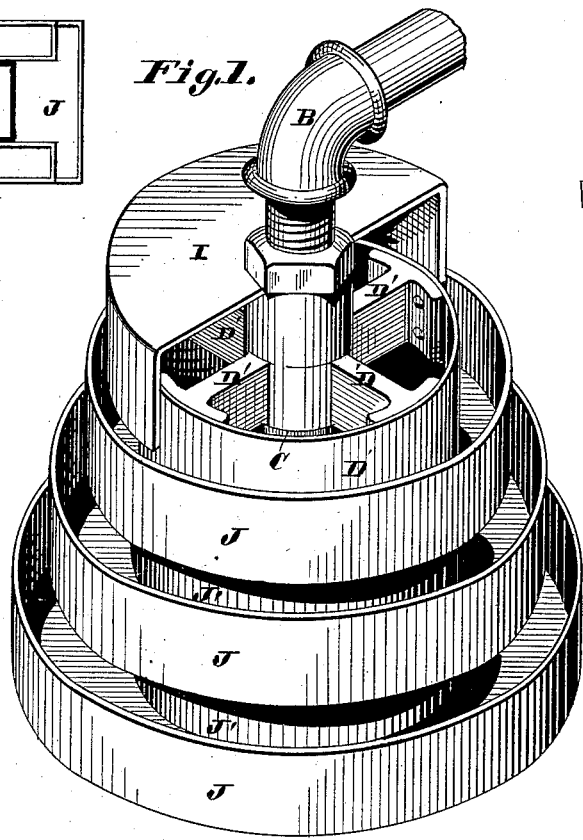
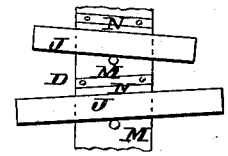
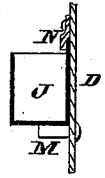
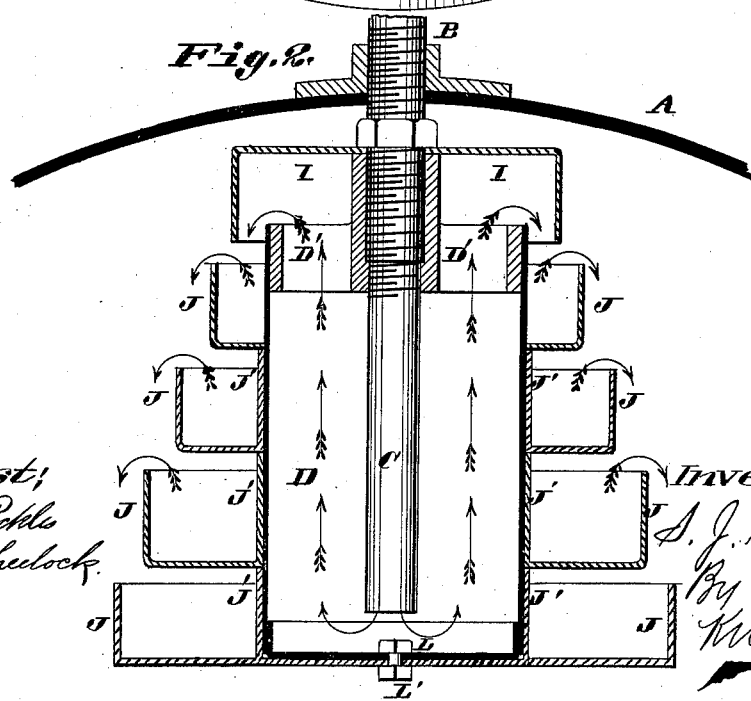
Attest:
Charles Pickels
Geo. L. Wheelock
Inventor:
S. J. Weaver
By
Knight Bros
Attys

UNITED STATES PATENT OFFICE.

SAMUEL J. WEAVER, OF ST. LOUIS, MISSOURI, ASSIGNOR OF ONE-HALF TO JOHN O'BRIEN, OF SAME PLACE.

HEATING FEED-WATER.

SPECIFICATION forming part of Letters Patent No. 304,679, dated September 2, 1884.

Application filed April 26, 1884. (No model.)

*To all whom it may concern:*

Be it known that I, SAMUEL J. WEAVER, of the city of St. Louis, in the State of Missouri, have invented a certain new and useful Improvement in Heating Feed-Water, of which the following is a full, clear, and exact description, reference being had to the accompanying drawings, forming part of this specification, and in which—

Figure 1 is a perspective view, the bottom pan removed. Fig. 2 is a vertical section. Figs. 3, 4, and 5 illustrate a modification, Fig. 3 being a horizontal section of the tank and a top view of the pans, Fig. 4 a detail side view, and Fig. 5 a detail vertical section.

My invention relates to a feeder for steam-boilers; and it consists in features of novelty hereinafter fully described, and pointed out in the claims.

Referring to the drawings, A represents part of the top of a boiler, and B the feed-pipe, having preferably an extension, C. Secured to the pipe is a tank or well, D, the connection preferably being made by means of a spider, D', into the hub of which the pipe screws, and to the arms of which the tank is made fast, as shown. The pipe discharges into this tank, and when the extension is used it is submerged in the water with which the tank is filled. Above the tank is a deflecting-hood, I, supported by the pipes or other suitable means, and on the outside of the tank are one or more pans, J, increasing in size downward. The water, as it is discharged from the tank, flows into the upper one of these pans, the hood acting to prevent it from being thrown up against the top of the boiler, and overflows from this into the next, and so on down until it is discharged into the boiler, by which time it will be heated to a high temperature.

The pans may be supported on the tank in any suitable way. I have shown each with a central flange, J', somewhat higher than the outer flange or rim, which fit the tank snugly, and upon each of which the pan above rests, as shown in Fig. 2. The lower pan has a bottom, which is made fast to the bottom of the tank by a bolt, L, having a nut or key, L', the removal of which will permit the pans to be taken off the tank to be cleaned and repaired, and they can be quickly replaced or substituted by others.

Both the tank and the pans may be of any desired shape and size. In my preferred form I have shown them both round, but they may be any other shape—as, for instance, the tank may be square and the pans oblong, as shown in Figs. 3, 4, and 5—and in these figures I have shown the pans supported differently—*i. e.*, by means of projections M on the tank, upon which the pans rest, and lips N, which engage the inner edges of the pans and prevent their tilting. The pans are formed, when thus supported, to straddle the tank, as shown plainly in Fig. 3, and they may be inclined, as shown in Fig. 4, in opposite directions, so that the water will have to travel from one end to the other of each pan before it is discharged.

By using the submerged pipe the water in the tank acts as a trap to prevent steam entering and bursting the supply-pipe, and dispensing with a valve for the purpose.

I claim as my invention—

1. In a boiler-feeder, the combination of the feed-pipe, tank, and two or more pans, increasing in size downward, arranged and operating substantially as and for the purpose set forth.

2. In a boiler-feeder, the combination of the feed-pipe, tank, hood, and two or more pans, increasing in size downward, arranged and operating substantially as and for the purpose set forth.

3. In a boiler-feeder, the combination of the feed-pipe, tank, and pan or pans located on the outside of the tank, arranged and operating substantially as shown and described.

4. In a boiler-feeder, the combination of the feed-pipe, tank, and pans, the pipe being submerged in the tank and the pans increasing in size downward, substantially as and for the purpose set forth.

5. In a boiler-feeder, the combination of the submerged feed-pipe, tank, hood, and two or more pans, increasing in size downward, arranged and operating substantially as and for the purpose set forth.

6. In a boiler-feeder, the combination of the feed-pipe, tank connected to the pipe by means of a spider, and two or more pans removably secured to the outside of the tank, substantially as set forth.

7. In a boiler-feeder, the combination of the feed-pipe, tank, and pans, the pans varying in size, and each having a central flange to support the pan above, the lower one having a bottom bolted to the tank, as set forth.

SAMUEL J. WEAVER.

In presence of—
  GEO. H. KNIGHT,
  SAML. KNIGHT.